United States Patent [19]
Miller

[11] Patent Number: 5,596,251
[45] Date of Patent: Jan. 21, 1997

[54] SERVO MOTOR-DRIVEN PLASTIC CUTTER SYSTEM FOR COMPRESSION MOLDING

[75] Inventor: Peter S. Miller, Crawfordsville, Ind.

[73] Assignee: Alcoa Closure Systems International, Inc., Crawfordsville, Ind.

[21] Appl. No.: 482,971

[22] Filed: Jun. 7, 1995

[51] Int. Cl.$^6$ .................................. H02P 3/08; B26D 5/38
[52] U.S. Cl. .......................... 318/366; 318/269; 264/148; 425/142
[58] Field of Search ..................................... 318/268, 269, 318/270, 276, 366; 83/324; 264/148; 425/142, 202, 301

[56] References Cited

U.S. PATENT DOCUMENTS

| | | |
|---|---|---|
| 3,825,044 | 7/1974 | Lidikay et al. . |
| 3,955,605 | 5/1976 | Zupan . |
| 4,080,136 | 3/1978 | Peller . |
| 4,277,431 | 7/1981 | Peller . |
| 4,287,847 | 9/1981 | Ohmi . |
| 5,213,021 | 5/1993 | Goforth et al. . |

Primary Examiner—Bentsu Ro
Attorney, Agent, or Firm—Dressler, Goldsmith, Shore & Milnamow Ltd.

[57] ABSTRACT

A system for cutting molten plastic material for compression molding includes a rotary-driven cutter mounted in operative association with an extruder which supplies molten plastic. The cutter is driven by a servo motor, the operation of which is coordinated with an associated rotary carousel on which cavities are successively presented to the cutter apparatus. In order to effect separation of each cut discrete quantity of plastic material from the cutting blade of the cutter apparatus, the servo motor is operated to create a period of distinct deceleration during each rotary cutting cycle, thereby effecting separation of the molten plastic from the surface of the cutting blade. The electronic controls of the apparatus further operate to permit the speed at which plastic cutting takes place to be controlled independently of the speed of the associated rotary carousel, while coordinating each cutting cycle with successive presentation of the cavities by the rotary carousel.

7 Claims, 5 Drawing Sheets

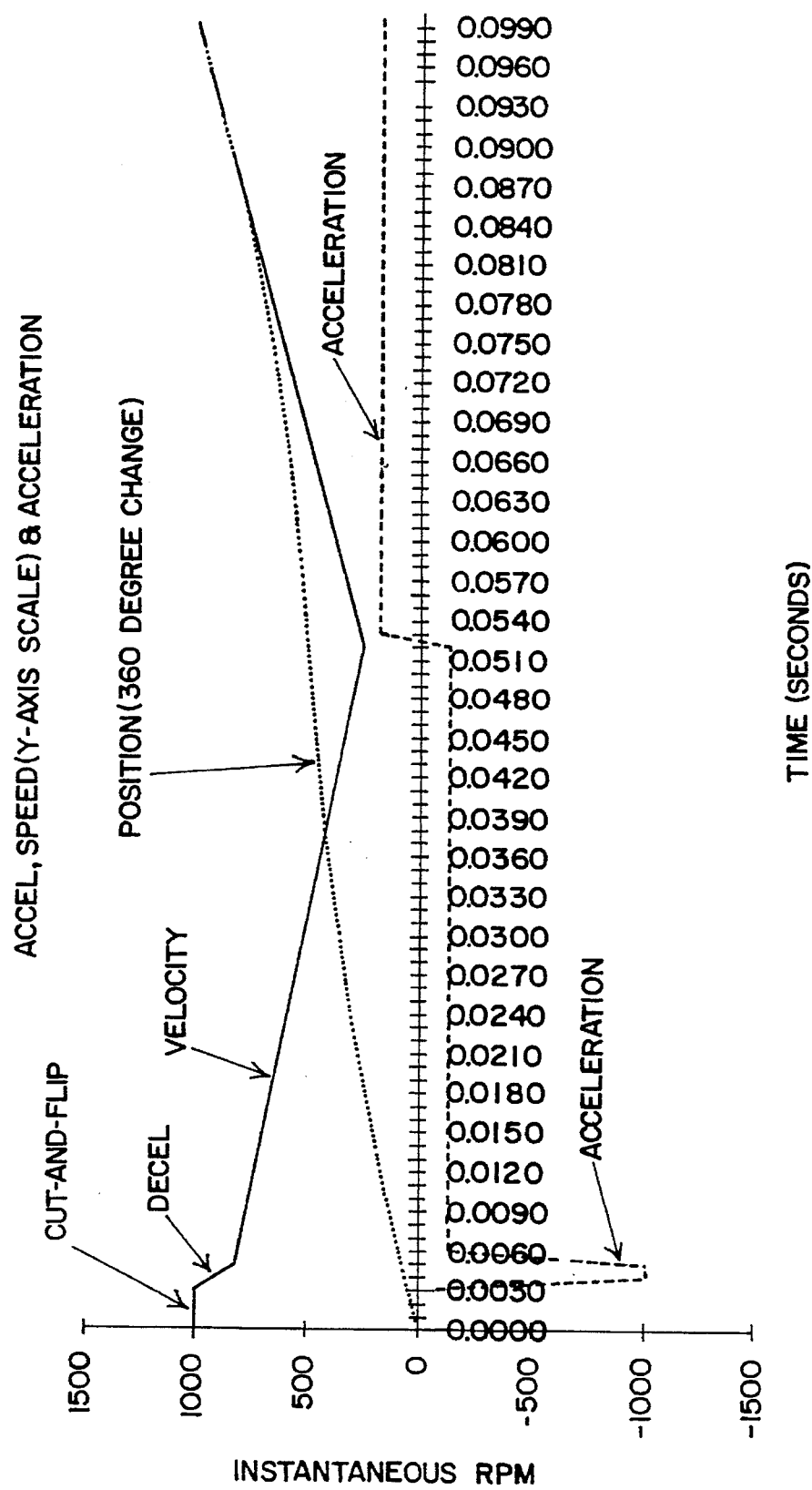

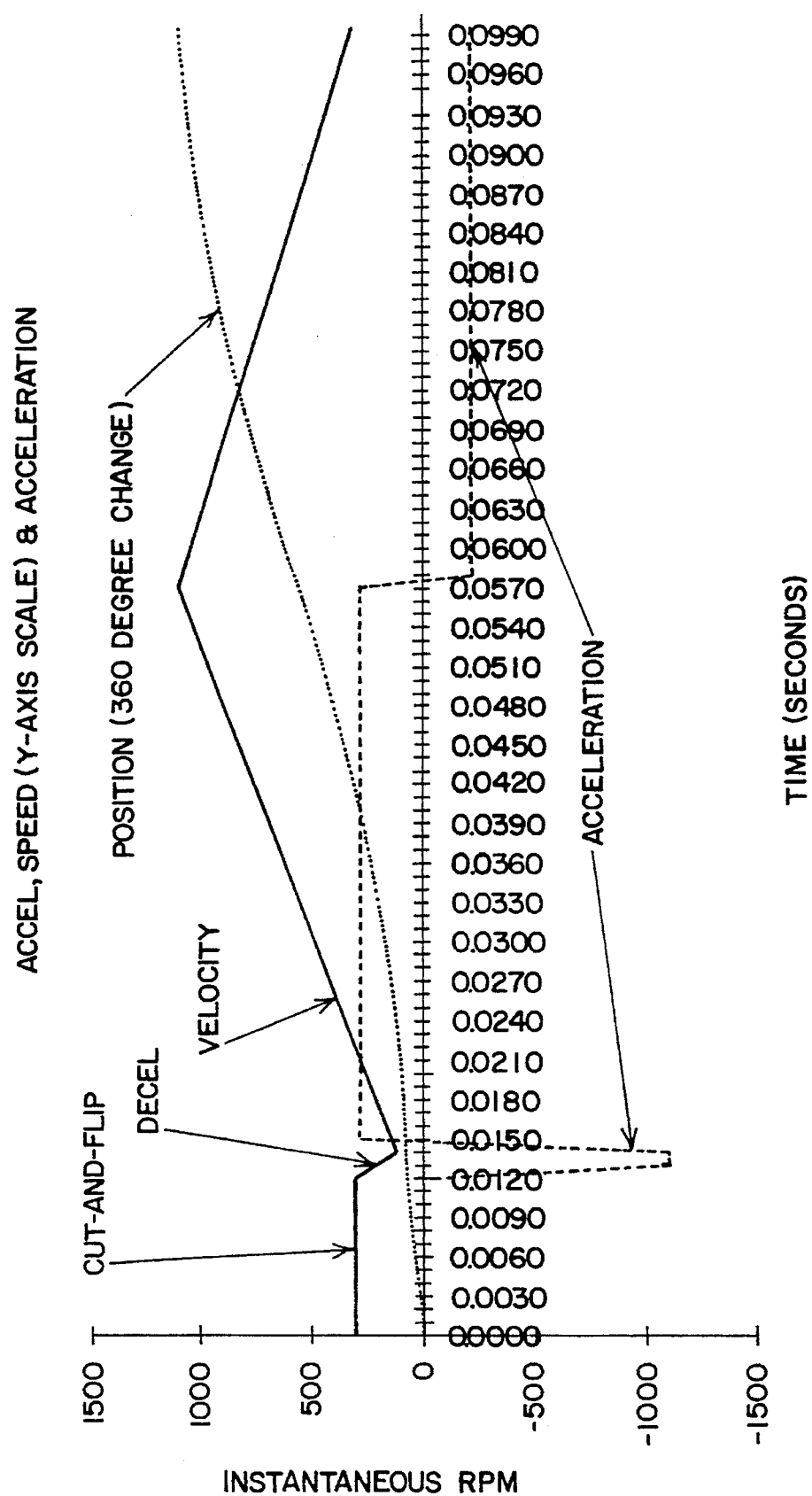

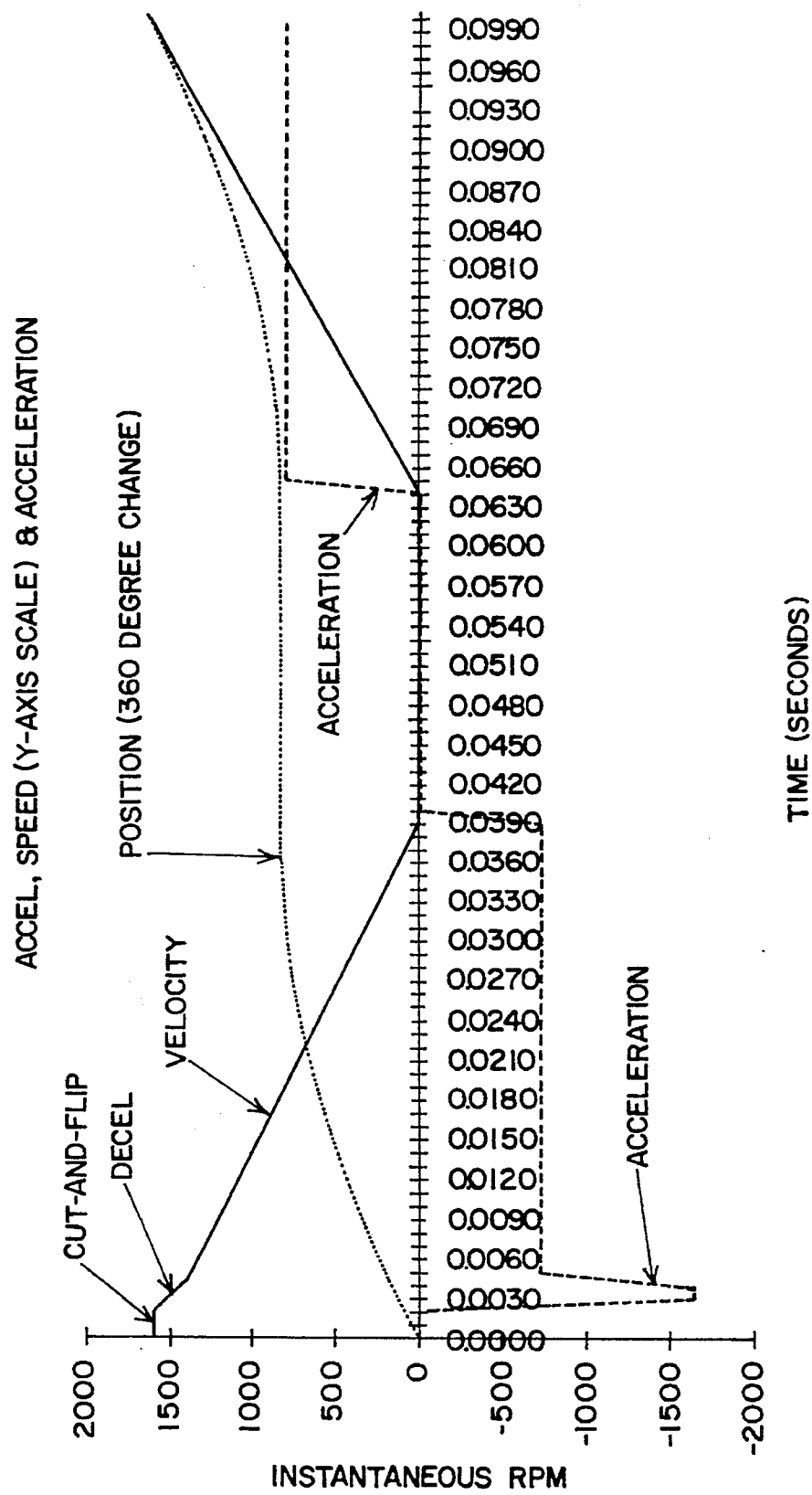

SERVO MOTOR-DRIVEN PLASTIC CUTTER SYSTEM FOR COMPRESSION MOLDING

TECHNICAL FIELD

The present invention relates generally to a method and apparatus for cutting discrete quantities of molten plastic material for subsequent compression molding of the material, and more particularly to a servo motor-driven plastic cutter system which facilitates cutting and placement of molten plastic pellets by electronically controlling movement of the cutter to facilitate separation of the plastic pellets from the cutting blade of the cutter.

BACKGROUND OF THE INVENTION

U.S. Pat. No. 4,277,431, to Peller, hereby incorporated by reference, discloses an apparatus for cutting discrete quantities or pellets of molten plastic material for subsequent placement in respective mold cavities. This apparatus is particularly suited for use in the manufacture of closures by compression molding, including the formation of compression molded closure shells, and the formation of compression molded liners within associated closure shells. U.S. Pat. Nos. 4,343,754 to Wilde et al., and 4,497,765 to Wilde et al., both hereby incorporated by reference, disclose compression molding of threaded, tamper-indicating plastic closures, and compression molding of liners in such closures, for which manufacturing processes the apparatus of the above U.S. Pat. No. 4,277,431 is suited for use.

The apparatus of U.S. Pat. No. 4,277,431 includes a nozzle through which molten plastic material is delivered from an associated extruder or the like, and a rotatably driven cutting blade which is rotated with respect to the nozzle. As plastic is extruded from the nozzle, a discrete quantity or pellet of plastic material is cut during each rotation of the associated cutting blade. Immediately thereafter, the severed plastic pellet is moved from the face of the nozzle by the cutting blade for delivery to a respective mold cavity. The mold cavity may comprise either a female mold die for formation of a closure shell by compression molding, or a closure shell within which the molten plastic is compression molded for formation of a sealing liner.

Notably, the cutter apparatus of the above patent is configured to facilitate separation of each plastic pellet from the cutting blade by creating a slight mechanical interference between the cutting blade and the face of the associated nozzle. Thus, as the cutting blade rotates with respect to the nozzle, the blade is flexed or deflected as it engages the nozzle face and severs the extruded plastic material. As the blade continues to rotate, with the severed plastic material carried on the flexed surface of the cutting blade, the cutting blade disengages the face of the nozzle, thereby rapidly accelerating the pellet to facilitate its separation from the blade and delivery of the pellet to one of the associated cavities. This cutting and subsequent "flicking" like action of the cutting blade is sometimes referred to as the "cut-and-flip" portion of each cutting cycle.

The above patent contemplates that the disclosed cutting apparatus be mechanically-driven from the associated molding apparatus, thus effecting the desired synchronous operation of the cutter. However, it will be appreciated that increases or decreases in production speed necessarily result in corresponding variation in the "cut-and-flip" portion of the cutting cycle, which can create undesirable variability in the speed, direction, rotational velocity, and orientation of the plastic pellet as it is delivered to the associated cavity. This can, in turn, create problems regarding pellet placement, orientation, and an undesirable tendency of the pellet to bounce upon delivery into the associated cavity.

In the past, servo motor-driven cutters have been employed so that the cut-and-flip speed of such cutting devices can be made independent of the speed of the associated molding device. While this facilitates operation of the cutter at speeds which are both higher and lower than the speed which is synchronous with the associated molder (thus facilitating the "cutting-and-flipping" at an optimized rate, independent of the speed of the associated molding apparatus) devices of this nature have continued to rely upon mechanical interference between the cutting blade and the nozzle face to effect blade deflection, and subsequent pellet acceleration for separation of each plastic pellet from the cutting blade. Additionally, such previous arrangements have sometimes required that the cutting blade be rotated in a reverse direction during a portion of each cutting cycle to achieve the desired cutting speed, while coordinating the rate of pellet production with the rate of the associated molding apparatus. Such reversal in blade rotation can undesirably cause problems of mechanical interference with associated equipment.

The present invention improves upon previously known arrangements for cutting molten plastic material by electronically creating specific rates of acceleration and deceleration, thereby facilitating separation of each plastic pellet from the associated cutting blade without reliance upon mechanical interference to deflect the blade during each rotary cutting cycle.

SUMMARY OF THE INVENTION

The present invention is directed to a servo motor-driven plastic pellet cutting system particularly suited for use in compression molding of plastic closure shells, and plastic liners in closure shells. In distinction from previously known arrangements, the present system avoids the need to create mechanical interference between a cutting blade and an associated nozzle face to facilitate separation of each molten plastic pellet from the cutting blade. Instead, the present system is operated, through electronic controls, to create a sufficiently high rate of deceleration during each rotation of the cutting blade so as to cause a molten plastic pellet (i.e., a discrete quantity of plastic material) to be separated from the cutting blade and thereby delivered into a respective mold cavity (i.e., either a molding die for formation of a closure, or a closure shell for formation of a liner).

The present system is used in conjunction with a rotary compression molding apparatus, which typically includes a rotating carousel or turret which carries cavities in the form of mold dies or closure shells. The present system effects delivery of discrete quantities of molten plastic material (i.e., plastic pellets) to the series of rotatably moved cavities by the provision of an extruder or like apparatus for providing a source of molten plastic material. The present system further includes a servo motor-driven rotary cutter including a cutting blade which is rotatably driven by the servo motor. The cutting blade is driven with respect to a nozzle of the extruder so that attendant to each rotation of the blade, the blade cuts a discrete quantity of plastic material as it is being extruded.

The system includes electronic controls for operating the servo motor, with practice of the present invention entailing operating the servo motor to subject the servo motor and the cutting blade to a sufficiently high rate of deceleration during each rotation thereof so as to cause each discrete quantity of plastic material to be separated from the cutting blade, and thereby delivered into a respective one of the series of mold cavities. Notably, this delivery of each molten plastic pellet is effected without significant flexure of the cutting blade, thus obviating the need for mechanical interference between the cutting blade and the nozzle face, as in arrangements heretofore known.

In addition to the servo motor, the present system includes a servo amplifier, an electronic position controller with suitable sequencing logic, a digital member containing cutter position data (and optionally including velocity dam), and means of generating the position and velocity data and loading them into digital memory. Notably, by monitoring the speed of the rotary carousel of the associated molding apparatus, the plastic cutting system can be operated in the desired synchronous manner with the molding apparatus. Additionally, the electronic controls of the present system permit operation of the servo motor-driven cutter to provide cutting of plastic material, and subsequent deceleration, at rams independent of the speed of movement of the cavities of the associated molding apparatus. This includes cutting of plastic material at a rate that is higher than a rate which is synchronous with the speed of movement of the cavities, with operation in this manner optionally including temporarily stopping rotation of the cutting blade, such as during periods of low production rate of the associated molding apparatus. Similarly, the system can be operated such that the rate at which plastic material cuts is lower than the rate which is synchronous with the speed of movement of the associated cavities. The present system desirably avoids any reverse rotation of the cutting blade during a cutting cycle. Instead, at "cut-and-flip" speeds which are sufficiently high as to otherwise require reverse motion under constant accelerations/decelerations, the present system causes the cutter to temporarily stop during each cycle of rotation, rather than reverse direction.

Other features and advantages of the present invention will become readily apparent from the following detailed description, the accompanying drawings, and the appended claims.

BRIEF DESCRIPTION OF THE DRAWINGS

FIGS. 3–5 are graphical illustrations of movement of the cutting blade of the present system during each rotary cutting cycle.

DETAILED DESCRIPTION

Figure 1:
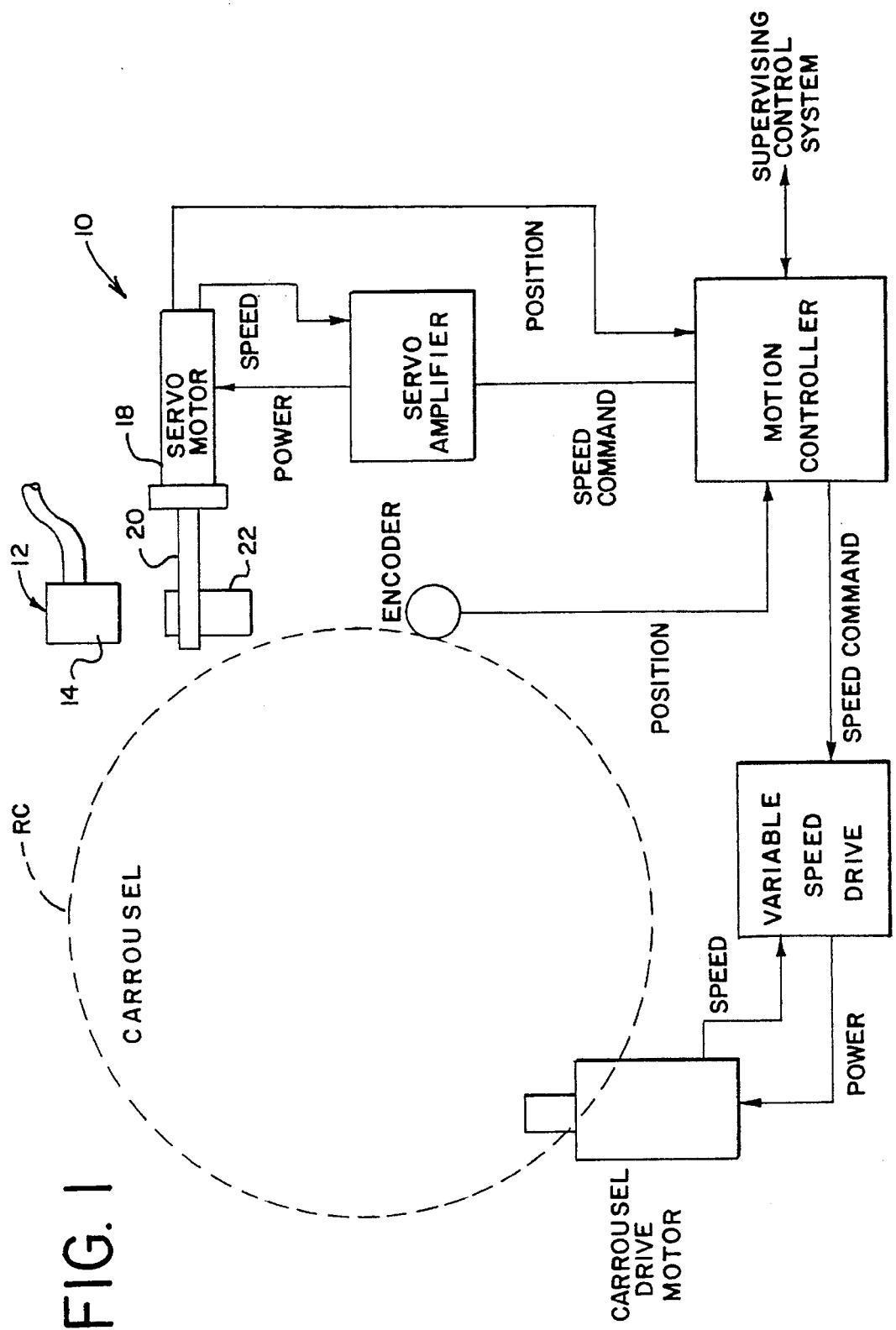
FIG. 1 is a diagrammatic view of the present system for cutting molten plastic material, and for delivery of discrete quantifies of plastic material to respective cavities carried by a carousel of an associated molding apparatus.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

In accordance with the present invention, a system is disclosed for cutting discrete quantifies of molten plastic material, i.e., pellets, and for effecting delivery of each discrete quantity into a respective one of a series of rotatably moving cavities. The present system is particularly suited for use in compression molding operations, such as for compression molding of plastic closures. Depending upon the application, the present system can be used for delivering quantities of molten plastic material into respective ones of mold cavities for formation of closure shells (such as threaded closures) or for delivery of plastic pellets into closure shells (either metal or plastic) for subsequent compression molding of sealing liners. Of course, the present system can be used for other compression molding applications apart from closure manufacture.

In distinction from previously known mechanically-driven cutting systems, the present system desirably reduces the inevitable variations in timing which can occur in a mechanically-driven system, and thereby reduces variations in the weight of each quantity of plastic material. Additionally, the present system facilitates operation of the cutter independently of speed of the associated rotary carousel of the molding apparatus on which the series of cavities are moved. An additional feature of the present system permits the cutting blade to be stopped in an out-of-the-way position with respect to the associated extruder nozzle, thereby facilitating set-up, maintenance, and like activities apart from actual operation of the system.

Figure 2:
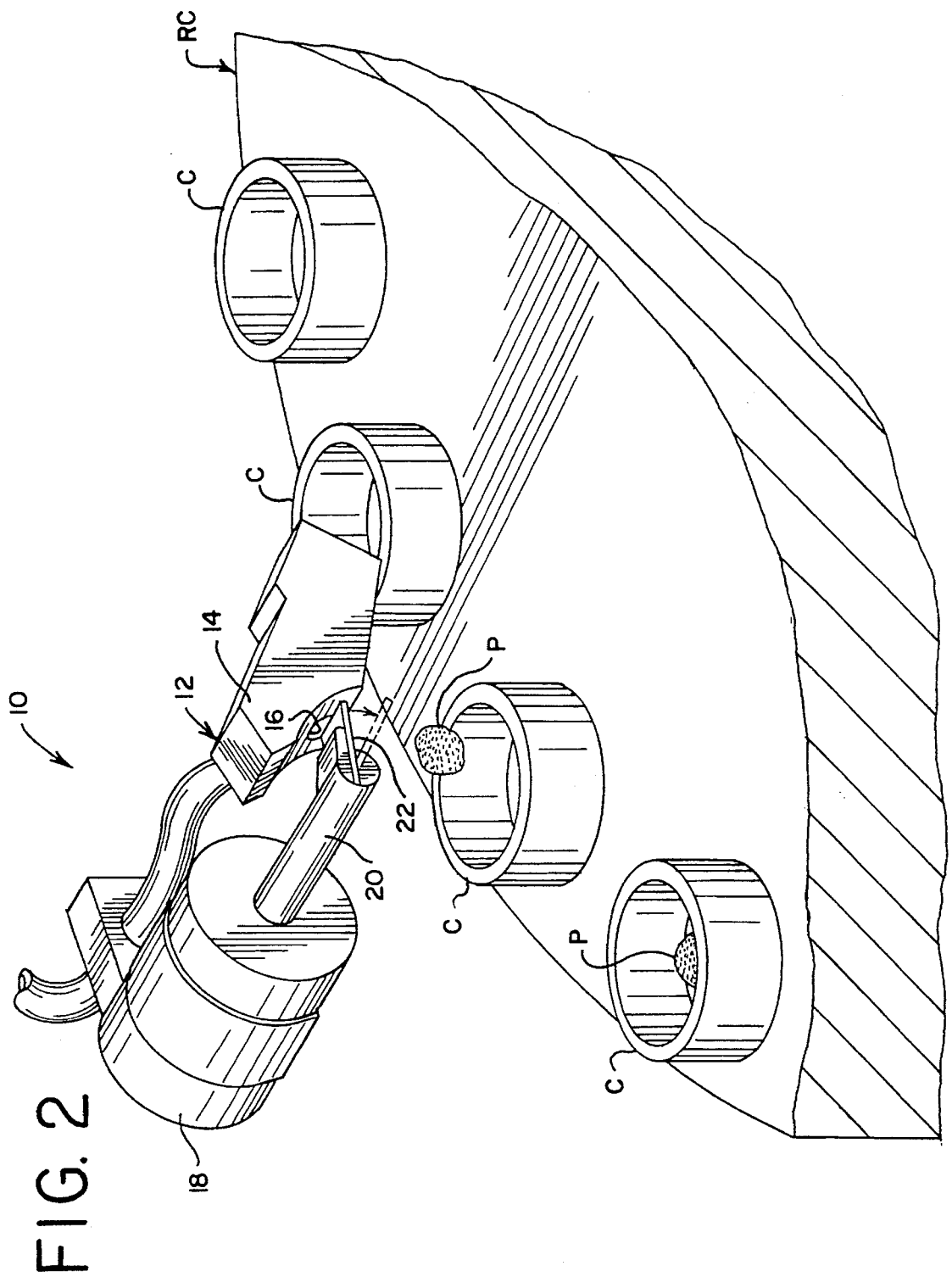
FIG. 2 is a diagrammatic view illustrating a servo motor-driven cutter of the present system, and illustrating delivery of quantities of plastic material to respective associated cavities.

As illustrated in FIG. 1, the present system, generally designated 10, is operated in conjunction with an extruder 12 including a nozzle 14 which provides a source of molten plastic material which is extruded through the face of a nozzle through an orifice 16 (FIG. 2). The system includes a servo motor 18 which includes a motor shaft 20, on which is mounted a cutting blade 22. The cutting edge of the cutting blade is spaced from and oriented generally parallel to the axis of rotation of the shaft 20, with the cutting edge moved adjacent to the face of nozzle 14. In this manner, attendant to each rotation of the cutting blade, a discrete quantity P of molten plastic material, i.e., a pellet of the extruded material or extrudate, is cut from the delivery stream. The cutting blade is rotated in coordination with rotary movement of a series of cavities C which are carried by a rotary carousel RC with respect to the cutter apparatus. As noted, the cavities C may be defined by mold dies or closure shells within which liners are to be formed. The present system is capable of delivering hundreds of plastic pellets per minute for respective disposition in the associated molds.

A servo amplifier is operatively connected to the servo motor 18, with an electronic position controller controlling operation of the motor. A digital memory contains cutter position data (and optionally, velocity data) and a means of generating the position and velocity data, and loading them into the digital memory.

The system includes a motion controller which, in conjunction with the servo motor and servo amplifier, forms a closed loop by which the angle of the cutter shaft 20 is caused to follow the motion profile stored as a sequence of numbers in the digital memory. The motion controller includes an electronic "clock" function that paces progress through the digital memory and hence the rate of cutter cycle execution.

The motion controller also forms a similar closed loop for controlling the position of the molding machine, i.e., the rotary carousel RC. This loop comprises a variable speed motor, an electronic "drive" for the motor, the molding machine (i.e., carousel) and a position sensing device, such as an angle encoder to measure the phase of the molding machine. The motion controller maintains both the mold cycle and cutter cycle in phase with the clock.

When the molding machine, including the rotary carousel RC starts up, the "clock" slowly increases its frequency from 0 to 1 corresponding to the intended production rate and maintains that frequency with a high degree of stability.

In a current embodiment, servo motor 18 is a Model R35KENC, and the servo amplifier is a Model SC723A, both available from Pacific Scientific Motor and Control Division, 4301 Kishwaukee Street, Rockford, Ill. The motion controller of the control system is a Model No. MSC-250, available from Industrial Indexing, Inc., Fishers Run, Victor, N.Y.

Four parameters, rate, cut-and-flip speed, deceleration, and duration of deceleration can be selectively controlled by the system. FIGS. 3 through 5 illustrate the motion of the cutter, including shaft 20 and cutting blade 22, for different values of these four parameters.

In accordance with the present invention, attendant to operation of the servo motor 18 for rotating cutting blade 22, the present system is operated to subject the servo motor and the cutting blade to a sufficiently high rate of deceleration during each cutting cycle so as to cause the discrete quantity of plastic material (i.e., the molten plastic pellet) to be separated from the cutting blade, and thereby delivered into a respective one of the series of cavities C. Thus, each of FIGS. 3, 4, and 5 show a pronounced period of deceleration (designated "DECEL" in the drawings) which corresponds to that portion of the cutting cycle immediately subsequent to actual cutting of the molten extrudate, during which portion of the cutting cycle delivery of the severed plastic material to the associated cavity is effected. Comparison of FIGS. 3 through 5 illustrates the versatility of the present system.

In FIG. 3, cutting of plastic material is being effected at a rate which is higher than the cutting rate at which the cutter apparatus would be operating synchronously with the associated rotary carousel RC. For operation in this manner, the electronic controls are programmed to provide the desired "cut-and-flip" speed, together with programming of the pronounced deceleration of the cutting blade which is required for effecting "clean" separation of the severed plastic pellet from the surface of the blade. Through the remaining duration of the cutting cycle, the speed of the cutting blade is controlled so that the overall cutting cycle is coordinated with the movement of the associated rotary carousel RC. Thus, during each cutting cycle, a next one of the cavities C is successively presented to the cutter apparatus, and a discrete quantity of plastic material deposited therein. While it is presently contemplated that the present system be operated such that a single discrete quantity of plastic be deposited in a respective one of the mold cavity C, it is within the purview of the present invention to effect operation for deposit of plural pellets into each of the cavities. Again, the pronounced deceleration of the cutting blade is created by the electronic controls to provide precise and predictable separation of the severed plastic pellet from the surface of the cutting blade.

FIG. 4 further illustrates operation of the present system at a rate independent of, but coordinated with, rotary motion of carousel RC. FIG. 4 illustrates operation of the cutter blade 22 at a cutting rate which is slower than the speed which would be synchronous with the associated rotary carousel. This cutting speed, represented on the Y-axis, is significantly lower than that shown in FIG. 3, with the cutting blade again subjected to marked deceleration subsequent to cutting of the cutting and severance of the plastic material for effecting delivery of the plastic material to the associated cavity. Thereafter, the cutting blade is accelerated, then decelerated through the remaining portion of the cutting cycle.

In FIG. 5, operation of the cutter apparatus at a rate higher than the synchronous speed is illustrated. In distinction from operation as shown in FIG. 3, operation of the system as illustrated in FIG. 5 contemplates that rotary motion of the cutting blade is temporarily stopped during the cutting cycle. Thus, cutting can be effected at the desired rate, even though this rate may be higher than the rate which would be synchronous with the production rate of the associated rotary carousel RC. Again, the cutting blade is subjected to pronounced deceleration subsequent to cutting of the plastic material for effecting separation of the plastic material from the cutting blade. As will be appreciated, operation of the present system in accordance with the graphical representation of FIG. 5 is optional, since the system can be operated such as illustrated in FIG. 3 to avoid stopping and starting of the cutting blade during each cutting cycle, while still being operated at cutting rates higher than the rate which is synchronous with the associated rotary carousel.

The electronic controls of the present system operate to coordinate operation of the cutter apparatus with the associated rotary carousel. The motion controller of the system synchronizes two motions ("axes"): that of the cutter and that of the rotary carousel. In the cutter axis, the servo motor 18 is driven by the servo amplifier. Speed feedback from a transducer mounted on the servo motor is used by the servo amplifier to control the motor speed to be equal to the speed command supplied from the motion controller. Position feedback from the transducer on the servo motor is used by the motion controller to control the motor shaft speed position by sending an appropriate speed command to the servo amplifier.

In the carousel axis, a drive motor is electrically driven by a variable speed electronic drive (similar in performance to a servo amplifier). Speed feedback from the transducer mounted on the drive motor is used by the variable speed electronic drive to control the motor speed equal to the speed command supplied from the motion controller. Position feedback from an angle encoder driven by the carousel is used by the motion controller to control the carousel position by sending an appropriate speed command to the variable speed drive.

In previous designs, the "drool" of extruded molten plastic from the nozzle prior to relatively moving the nozzle and cutter so that the cutter is in position to make pellets requires that the rotating blade avoid the stream of molten plastic to avoid becoming entangled in it. In the present system, the electronic controls permit the cutting blade to be stopped at a position pointing away from the nozzle (even while the associated molding apparatus continues to operate) to permit the molten plastic extrudate to be clear of the cutter. Starting and stopping of the cutter is performed within the accelerating torque capabilities of the servo motor 18 and synchronously with the positions of the successively presented mold cavities.

As noted, the present system is operated consistent with four parameters, rate, cut-and-flip speed, deceleration, and duration of deceleration. It is presently contemplated that when a change in one or more of these parameters is desired, new position/velocity data are calculated and loaded into an alternate digital memory. After loading is complete, the position controller of the system switches control on-the-fly to the alternate digital memory at a point where the position and velocity of the two memories' data are equal (necessary to avoid calling for unattainable acceleration or velocity from the cutter servo motor, which would result in unpredictable behavior). To handle those situations, where old and new cycles do not have points of identical speed an position, additional distal memories are loaded with "transition" data having separate speed/position-matching points for the old and new cycles.

From the foregoing, it will be observed that numerous modifications and variations can be effected without departing from the true spirit and scope of the novel concept of the present invention. It is not intended that the present invention be limited to the specific embodiment illustrated herein. The disclosure is intended to cover, by the appended claims, all such modifications as fall within the scope of the claims.

What is claimed is:

1. A method of delivering discrete quantities of plastic material to a series of associated cavities, comprising the steps of:
   providing a source of molten plastic material;
   providing a servo motor-driven rotary cutter including a cutting blade, and rotatably driving said blade with respect to said source of plastic material so that each rotation of said blade cuts a discrete quantity of molten plastic material; and
   providing electronic control means for operating the servo motor, and operating said servo motor to subject said servo motor and said cutting blade to a sufficiently high rate of deceleration during each rotation thereof so as to cause each discrete quantity of plastic material to be separated from said cutting blade and thereby delivered into a respective one of said series of cavities.

2. A method of delivering quantities of plastic material in accordance with claim 1, including
   rotating said cutting blade with respect to said source of plastic material without significant flexure of said cutting blade.

3. A method of delivering a quantity of plastic material, in accordance with claim 2, including
   rotatably moving said series of cavities, and monitoring the speed of movement of said cavities, and
   operating said servo motor-driven cutter to provide cutting of plastic material, and subsequent deceleration at rates independent of the speed of movement of said cavities.

4. A method of delivering quantities of plastic material in accordance with claim 3, including
   cutting said plastic material at a rate that is higher than a rate which is synchronous with the speed of movement of said cavities.

5. A method of delivering a quantity of plastic material in accordance with claim 4, including
   temporarily stopping rotation of said cutting blade.

6. A method of delivering a quantity of plastic material in accordance with claim 3, including
   cutting said plastic material at a rate that is lower than a rate which is synchronous with the speed of movement of said cavities.

7. An apparatus for delivering discrete quantities of plastic material to a series of rotatably moving cavities, comprising:
   an extruder having a nozzle for providing molten plastic material;
   a servo motor-driven rotary cutter including a rotatably driven cutting blade mounted for movement adjacent said nozzle of said extruder so that a discrete quantity of plastic material is cut during each rotation of said cutting blade; and
   electronic control means for operating the servo motor to subject said servo motor and said cutting blade to a sufficiently high rate of deceleration during each rotation of said cutting blade so as to cause each discrete quantity of plastic material to be separated from said cutting blade and thereby delivered to a respective one of said series of cavities.

* * * * *